US012271822B2

(12) United States Patent
Zhang et al.

(10) Patent No.: US 12,271,822 B2
(45) Date of Patent: Apr. 8, 2025

(54) ACTIVE LEARNING VIA A SAMPLE CONSISTENCY ASSESSMENT

(71) Applicant: Google LLC, Mountain View, CA (US)

(72) Inventors: Zizhao Zhang, San Jose, CA (US); Tomas Jon Pfister, Foster City, CA (US); Sercan Omer Arik, San Francisco, CA (US); Mingfei Gao, Greenbelt, MD (US)

(73) Assignee: GOOGLE LLC, Mountain View, CA (US)

( * ) Notice: Subject to any disclaimer, the term of this patent is extended or adjusted under 35 U.S.C. 154(b) by 951 days.

(21) Appl. No.: 17/000,094

(22) Filed: Aug. 21, 2020

(65) Prior Publication Data

US 2021/0056417 A1 Feb. 25, 2021

Related U.S. Application Data

(60) Provisional application No. 62/890,379, filed on Aug. 22, 2019.

(51) Int. Cl.
*G06N 3/044* (2023.01)
*G06F 7/24* (2006.01)
(Continued)

(52) U.S. Cl.
CPC ............... *G06N 3/084* (2013.01); *G06F 7/24* (2013.01); *G06F 18/211* (2023.01);
(Continued)

(58) Field of Classification Search
CPC .......... G06N 3/084; G06N 3/08; G06N 20/00; G06N 3/045; G06N 3/088; G06F 7/24;
(Continued)

(56) References Cited

U.S. PATENT DOCUMENTS

| 2014/0040169 A1 | 2/2014 | Forman | |
|---|---|---|---|
| 2014/0282586 A1* | 9/2014 | Shear | G06F 40/00 718/104 |

(Continued)

OTHER PUBLICATIONS

Keze Wang et al: "Cost-Effective Active Learning for Deep Image Classification", arxiv.org, Cornell University Library, 201 Olin Library Cornell University Ithaca, NY 14853, Jan. 13, 2017 (Jan. 13, 2017), DOI: 10.1109/TCSVT.2016.2589879 Abstract; Sections III.A and I II.B; figure 1, 10 pages.

(Continued)

*Primary Examiner* — Brandon S Cole
(74) *Attorney, Agent, or Firm* — DORITY & MANNING P.A.

(57) ABSTRACT

A method for active learning includes obtaining a set of unlabeled training samples and for each unlabeled training sample, perturbing the unlabeled training sample to generate an augmented training sample. The method includes generating, using a machine learning model, a predicted label for both samples and determining an inconsistency value for the unlabeled training sample that represents variance between the predicted labels for the unlabeled and augmented training samples. The method includes sorting the unlabeled training samples based on the inconsistency values and obtaining, for a threshold number of samples selected from the sorted unlabeled training samples, a ground truth label. The method includes selecting a current set of labeled training samples including each selected unlabeled training samples paired with the corresponding ground truth label. The method includes training, using the current set and a proper subset of unlabeled training samples, the machine learning model.

15 Claims, 7 Drawing Sheets

(51) Int. Cl.
    *G06F 18/211*     (2023.01)
    *G06F 18/214*     (2023.01)
    *G06N 3/045*     (2023.01)
    *G06N 3/08*     (2023.01)
    *G06N 3/084*     (2023.01)
    *G06N 7/01*     (2023.01)
    *G06N 20/00*     (2019.01)

(52) U.S. Cl.
    CPC ........... *G06F 18/2155* (2023.01); *G06N 3/08* (2013.01); *G06N 20/00* (2019.01)

(58) Field of Classification Search
    CPC .. G06F 18/211; G06F 18/2155; G06F 18/241; G06F 18/214
    See application file for complete search history.

(56) References Cited

U.S. PATENT DOCUMENTS

| | | | | |
|---|---|---|---|---|
| 2019/0050427 A1* | 2/2019 | Wiesel | ................... | G06T 19/00 |
| 2019/0325275 A1* | 10/2019 | Lee | ................. | G06V 30/19167 |
| 2020/0005096 A1* | 1/2020 | Calmon | ................. | G06N 20/10 |
| 2020/0057706 A1* | 2/2020 | Rome | ................. | H04L 63/1425 |

OTHER PUBLICATIONS

International Search Report and Written Opinion for the related Application No. PCT/US2020/047534, Dated Aug. 21, 2020, 15 pages.

* cited by examiner

ACTIVE LEARNING VIA A SAMPLE CONSISTENCY ASSESSMENT

CROSS REFERENCE TO RELATED APPLICATIONS

This U.S. patent application claims priority under 35 U.S.C. § 119(e) to U.S. Provisional Application 62/890,379, filed on Aug. 22, 2019. The disclosures of this prior application is considered part of the disclosure of this application and is hereby incorporated by reference in its entirety.

TECHNICAL FIELD

This disclosure relates to active learning such as active learning using a sample consistency assessment.

BACKGROUND

Generally, supervised machine learning models require large amounts of labeled training data in order to accurately predict results. However, while obtaining large amounts of unlabeled data is often easy, labeling the data is frequently very difficult. That is, labeling vast quantities of data is often inordinately expensive if not outright impossible. Thus, active learning is a popular type of machine learning that allows for the prioritization of unlabeled data in order to train a model only on data that will have the highest impact (i.e., the greatest increase in accuracy). Typically, an active learning algorithm is first trained on a small sub-set of labeled data and then may actively query a teacher to label select unlabeled training samples. The process of selecting the unlabeled training samples is an active field of study.

SUMMARY

One aspect of the disclosure provides a method for active learning via a sample consistency assessment. The method includes obtaining, by data processing hardware, a set of unlabeled training samples. During each of a plurality of active learning cycles and for each unlabeled training sample in the set of unlabeled training samples, the method includes perturbing, by the data processing hardware, the unlabeled training sample to generate an augmented training sample. The method also includes, generating, by the data processing hardware, using the machine learning model configured to receive the unlabeled training sample and the augmented training sample as inputs, a predicted label for the unlabeled training sample and a predicted label for the augmented training sample and determining, by the data processing hardware, an inconsistency value for the unlabeled training sample. The inconsistency value represents variance between the predicted label for the unlabeled training sample and the predicted label for the augmented training sample. The method also includes sorting, by the data processing hardware, the unlabeled training samples in the set of unlabeled training samples in descending order based on the inconsistency values and obtaining, by the data processing hardware, for each unlabeled training sample in a threshold number of unlabeled training samples selected from the sorted unlabeled training samples in the set of unlabeled training samples, a ground truth label. The method includes selecting, by the data processing hardware, a current set of labeled training samples. The current set of labeled training samples includes each unlabeled training sample in the threshold number of unlabeled training samples selected from the sorted unlabeled training samples in the set of unlabeled training samples paired with the corresponding obtained ground truth label. The method also includes training, by the data processing hardware, using the current set of labeled training samples and a proper subset of unlabeled training samples from the set of unlabeled training samples, the machine learning model.

Implementations of the disclosure may include one or more of the following optional features. In some implementations, the threshold number of unlabeled training samples is less than a cardinality of the set of unlabeled training samples. The inconsistency value for each unlabeled training sample in the threshold number of unlabeled training samples may be greater than the inconsistency value for each unlabeled training sample not selected from the sorted unlabeled training samples in the set of unlabeled training samples.

Optionally, the method further includes obtaining, by the data processing hardware, the proper subset of unlabeled training samples from the set of unlabeled training samples by removing the threshold number of unlabeled training samples from the set of unlabeled training samples. The method may further include selecting, by the data processing hardware, a first M number of unlabeled training samples from the sorted unlabeled training samples in the set of unlabeled training samples as the threshold number of unlabeled training samples.

In some examples, the method further includes, during an initial active learning cycle, randomly selecting, by the data processing hardware, a random set of unlabeled training samples from the set of unlabeled training samples and obtaining, by the data processing hardware, corresponding ground truth labels for each unlabeled training sample in the random set of unlabeled training samples. The method may also further include training, by the data processing hardware, using the random set of unlabeled training samples and the corresponding ground truth labels, the machine learning model. This example may include, during the initial active learning cycle, identifying, by the data processing hardware, a candidate set of unlabeled training samples from the set of unlabeled training samples. A cardinality of the candidate set of unlabeled training samples may be less than a cardinality of the set of unlabeled training samples. The method may also further include determining, by the data processing hardware, a first cross entropy between a distribution of ground truth labels and a distribution of predicted labels generated using the machine learning model for the unlabeled training samples in the candidate set of unlabeled training samples and determining, by the data processing hardware, a second cross entropy between a distribution of ground truth labels and a distribution of predicted labels generated using the machine learning model for the unlabeled training samples in the set of unlabeled training samples. The method may also further include determining, by the data processing hardware, whether the first cross entropy is greater than or equal to the second cross entropy and, when the first cross entropy is greater than or equal to the second cross entropy, selecting, by the data processing hardware, the candidate set of unlabeled training samples as a starting size for initially training the machine learning model. Identifying the candidate set of unlabeled training samples from the set of unlabeled training samples, in some implementations, includes determining the inconsistency value for each unlabeled training sample of the set of unlabeled training samples.

In some implementations, the method may further include, when the first cross entropy is less than the second cross entropy, randomly selecting, by the data processing hardware, an expanded set of training samples from the unlabeled set of training samples and updating, by the data processing hardware, the candidate set of unlabeled training samples to include the expanded set of training samples randomly selected from the unlabeled set of training samples. The method may also further include updating, by the data processing hardware, the unlabeled set of training samples by removing each training sample from the expanded set of training samples from the unlabeled set of training samples. During an immediately subsequent active learning cycle, the method may also further include determining, by the data processing hardware, the first cross entropy between a distribution of ground truth labels and a distribution of predicted labels generated using the machine learning model for the training samples in the updated candidate set of unlabeled training samples and determining, by the data processing hardware, the second cross entropy between the distribution of ground truth labels and a distribution of predicted labels generating using the machine learning model for the training samples in the updated candidate set of unlabeled training samples. The method may also further include determining, by the data processing hardware, whether the first cross entropy is greater than or equal to the second cross entropy. When the first cross entropy is greater than or equal to the second cross entropy, the method may further include selecting, by the data processing hardware, the updated candidate set of unlabeled training samples as a starting size for initially training the machine learning model. In some examples, the machine learning model includes a convolutional neural network.

Another aspect of the disclosure provides data processing hardware and memory hardware in communication with the data processing hardware. The memory hardware stores instructions that when executed on the data processing hardware cause the data processing hardware to perform operations. The operations include obtaining a set of unlabeled training samples. During each of a plurality of active learning cycles and for each unlabeled training sample in the set of unlabeled training samples, the operations include perturbing the unlabeled training sample to generate an augmented training sample. The operations also include, generating, using the machine learning model configured to receive the unlabeled training sample and the augmented training sample as inputs, a predicted label for the unlabeled training sample and a predicted label for the augmented training sample and determining an inconsistency value for the unlabeled training sample. The inconsistency value represents variance between the predicted label for the unlabeled training sample and the predicted label for the augmented training sample. The operations also include sorting the unlabeled training samples in the set of unlabeled training samples in descending order based on the inconsistency values and obtaining, for each unlabeled training sample in a threshold number of unlabeled training samples selected from the sorted unlabeled training samples in the set of unlabeled training samples, a ground truth label. The operations include selecting a current set of labeled training samples. The current set of labeled training samples includes each unlabeled training sample in the threshold number of unlabeled training samples selected from the sorted unlabeled training samples in the set of unlabeled training samples paired with the corresponding obtained ground truth label. The operations also include training, using the current set of labeled training samples and a proper subset of unlabeled training samples from the set of unlabeled training samples, the machine learning model.

This aspect may include one or more of the following optional features. In some implementations, the threshold number of unlabeled training samples is less than a cardinality of the set of unlabeled training samples. The inconsistency value for each unlabeled training sample in the threshold number of unlabeled training samples may be greater than the inconsistency value for each unlabeled training sample not selected from the sorted unlabeled training samples in the set of unlabeled training samples.

Optionally, the operations further include obtaining the proper subset of unlabeled training samples from the set of unlabeled training samples by removing the threshold number of unlabeled training samples from the set of unlabeled training samples. The operations may further include selecting a first M number of unlabeled training samples from the sorted unlabeled training samples in the set of unlabeled training samples as the threshold number of unlabeled training samples.

In some examples, the operations further include, during an initial active learning cycle, randomly selecting a random set of unlabeled training samples from the set of unlabeled training samples and obtaining corresponding ground truth labels for each unlabeled training sample in the random set of unlabeled training samples. The operations may also further include training, using the random set of unlabeled training samples and the corresponding ground truth labels, the machine learning model. This example may include, during the initial active learning cycle, identifying a candidate set of unlabeled training samples from the set of unlabeled training samples. A cardinality of the candidate set of unlabeled training samples may be less than a cardinality of the set of unlabeled training samples. The operations may also further include determining a first cross entropy between a distribution of ground truth labels and a distribution of predicted labels generated using the machine learning model for the unlabeled training samples in the candidate set of unlabeled training samples and determining a second cross entropy between a distribution of ground truth labels and a distribution of predicted labels generated using the machine learning model for the unlabeled training samples in the set of unlabeled training samples. The operations may also further include determining whether the first cross entropy is greater than or equal to the second cross entropy and, when the first cross entropy is greater than or equal to the second cross entropy, selecting the candidate set of unlabeled training samples as a starting size for initially training the machine learning model. Identifying the candidate set of unlabeled training samples from the set of unlabeled training samples, in some implementations, includes determining the inconsistency value for each unlabeled training sample of the set of unlabeled training samples.

In some implementations, the operations may further include, when the first cross entropy is less than the second cross entropy, randomly selecting an expanded set of training samples from the unlabeled set of training samples and updating the candidate set of unlabeled training samples to include the expanded set of training samples randomly selected from the unlabeled set of training samples. The operations may also further include updating the unlabeled set of training samples by removing each training sample from the expanded set of training samples from the unlabeled set of training samples. During an immediately subsequent active learning cycle, the operations may also further include determining the first cross entropy between a distribution of ground truth labels and a distribution of predicted labels generated using the machine learning model for the training samples in the updated candidate set of unlabeled training samples and determining the second cross entropy between the distribution of ground truth labels and a distribution of predicted labels generating using the machine learning model for the training samples in the updated candidate set of unlabeled training samples. The operations may also further include determining whether the first cross entropy is greater than or equal to the second cross entropy. When the first cross entropy is greater than or equal to the second cross entropy, the operations may further include selecting the updated candidate set of unlabeled training samples as a starting size for initially training the machine learning model. In some examples, the machine learning model includes a convolutional neural network.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

As acquiring vast quantities of data becomes cheaper and easier, advances in machine learning are capitalizing by training models using deep learning methods on large amounts of data. However, this raises new challenges, as typically the data is unlabeled which requires labeling prior to use with supervised learning or semi-supervised learning models. Conventionally, training data is labeled by human operators. For example, when preparing training samples for a model that performs object detection with frames of image data, an expert annotator (e.g., a trained human) may label frames of image data by drawing a bounding box around pedestrians. When the quantity of data is vast, manually labeling the data is expensive at best and impossible at worst.

One popular approach to the data labeling problem is active learning. In active learning, the model is allowed to proactively select a subset of training samples from a set of unlabeled training samples and request the subset be labeled from an "oracle," e.g., an expert annotator or any other entity that may accurately label the selected samples (i.e., the "ground truth" label). That is, active learning modules dynamically pose queries during training to actively select which samples to train on. Active learning has the potential to greatly reduce the overhead of labeling data while simultaneously increasing accuracy with substantially less labeled training samples.

In order to select samples that are useful to improve the target model, selection methods typically depend on outputs and/or intermediate features of the target model to measure unlabeled samples. For example, a method may use entropy of the output to measure uncertainty. Another method may ensure that selected samples cover a large range of diversity. Yet another method may use predicted loss to attempt to select the most valuable samples. However, all of these methods struggle to apply to convolutional neural networks (CNN) when the labeling budget is small, because typically a large set of labeled data is needed for accurate CNN models.

Implementations herein are directed toward an active learning model trainer that trains a model (e.g., a CNN model) without introducing additional labeling cost. The trainer uses unlabeled data to improve the quality of the trained model while keeping the number of labeled samples small. The trainer is based upon the assumption that a model should be consistent in its decisions between a sample and a meaningfully distorted version of the same sample (i.e., a consistency of predictions).

Figure 1:
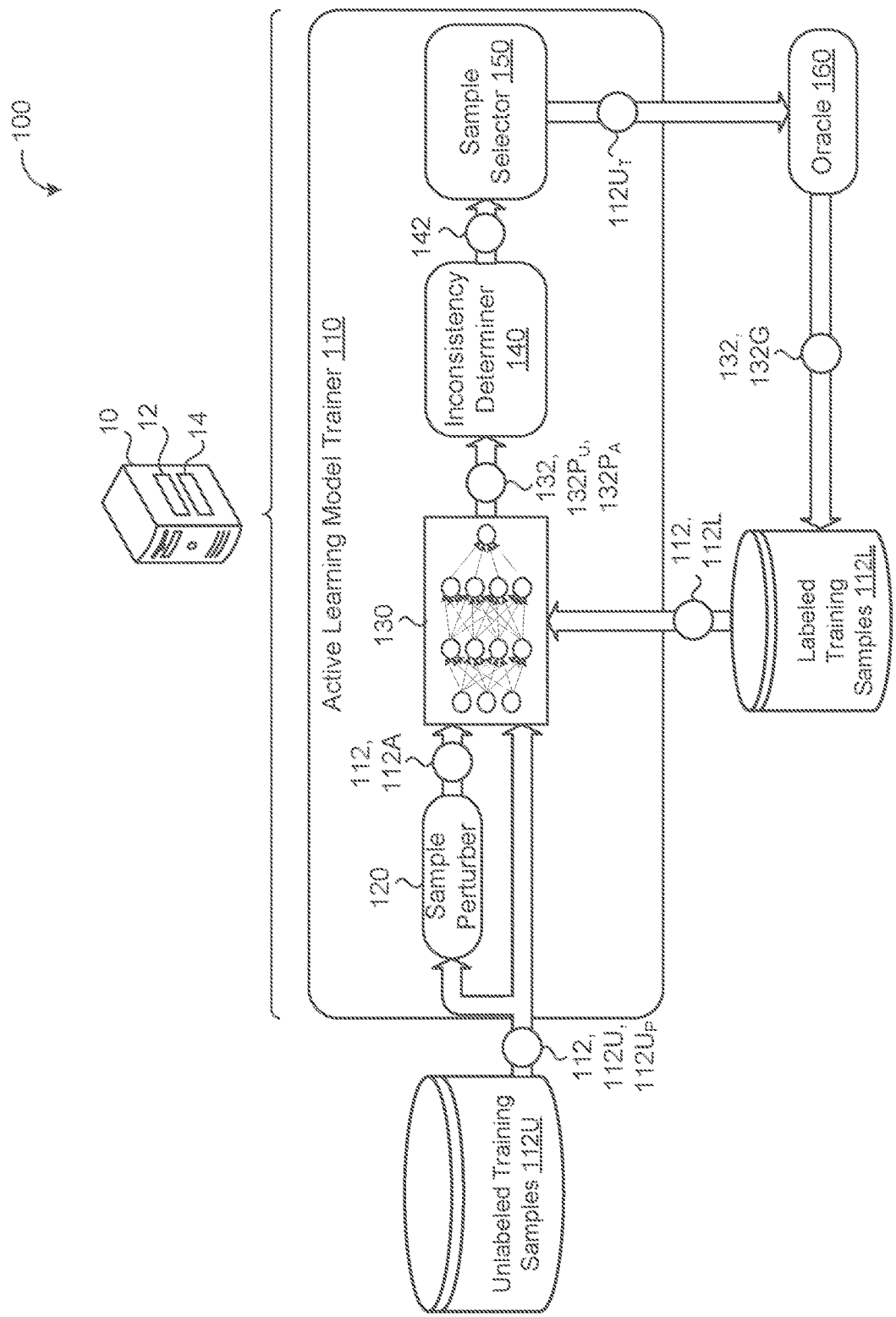
FIG. 1 is a schematic view of an example system for training an active learning model.

Referring to FIG. 1, in some implementations, an example system 100 includes a processing system 10. The processing system 10 may be a single computer, multiple computers, or a distributed system (e.g., a cloud environment) having fixed or scalable/elastic computing resources 12 (e.g., data processing hardware) and/or storage resources 14 (e.g., memory hardware). The processing system 10 executes an active learning model trainer 110. The model trainer 110 trains a target model 130 (e.g., a machine learning model) to make predictions based on input data. For example, the model trainer 110 trains a convolutional neural network (CNN). The model trainer 110 trains the target model 130 on a set of unlabeled training samples 112, 112U. An unlabeled training sample refers to data that does not include any annotations or other indications of the correct result for the target model 130 which is in contrast to labeled data that does include such annotations. For example, labeled data for a target model 130 that is trained to transcribe audio data includes the audio data as well as a corresponding accurate transcription of the audio data. Unlabeled data for the same target model 130 would include the audio data without the transcription. With labeled data, the target model 130 may make a prediction based on a training sample and then easily compare the prediction to the label serving as a ground-truth to determine how accurate the prediction was. In contrast, such feedback is not available with unlabeled data.

The unlabeled training samples 112U may be representative of whatever data the target model 130 requires to make its predictions. For example, the unlabeled training data my include frames of image data (e.g., for object detection or classification, etc.), frames of audio data (e.g., for transcription or speech recognition, etc.), and/or text (e.g., for natural language classification, etc.). The unlabeled training samples 112U may be stored on the processing system 10 (e.g., within memory hardware 14) or received, via a network or other communication channel, from another entity.

The model trainer 110 includes a sample perturber 120. The sample perturber 120 receives each unlabeled training sample 112U in the set of unlabeled training samples 112U and perturbs each unlabeled training sample 112U to generate a corresponding augmented training sample 112, 112A. That is, the sample perturber 120 introduces small, but meaningful changes to each unlabeled training sample 112U. For example, the sample perturber 120 increases or decreases values by a predetermined or random amount to generate a pair of training samples 112 that includes the original unlabeled training sample 112U and the corresponding augmented (i.e., perturbed) training sample 112A. As another example, when the unlabeled training sample 112U includes a frame of image data, the sample perturber 120 may rotate the image, flip the image, crop the image, etc. The sample perturber 120 may use any other conventional means of perturbing the data as well.

As discussed in more detail below, the target model 130 (i.e., the machine learning model the active learning model trainer 110 is training) is initially trained on a small set of labeled training samples 112, 112L and/or unlabeled training samples 112U. This quickly provides the target model 130 with rough initial prediction capabilities. This minimally-trained target model 130 receives, for each unlabeled training sample 112U, the unlabeled training sample 112U and the corresponding augmented training sample 112A. The target model 130, using the unlabeled training sample 112U, generates a predicted label 132, $132P_U$. The predicted label $132P_U$ represents the target model's prediction based on the unlabeled training sample 112I and the model's training to this point. The target model 130, using the augmented training sample 112A, generates another predicted label 132, $132P_A$. The predicted label $132P_A$ represents the target model's prediction based on the augmented training sample 112A and the model's training to this point. Note that the target model 130 typically is not configured to process both the unlabeled training sample 112U and the augmented training sample 112A simultaneously, and instead processes them sequentially (in either order) to first, generate a first prediction label 132P with either one of the unlabeled training sample 112U or the augmented training sample 112A, and second, generate a second prediction label 132P with the other one of the unlabeled training sample 112U or the augmented training sample 112A.

The active learning model trainer 110 includes an inconsistency determiner 140. The inconsistency determine 140 receives both predictions $132P_U$, $132P_A$ for each pair of samples 112 for each unlabeled training sample 112I in the set of unlabeled training samples 112U. The inconsistency determiner 140 determines an inconsistency value 142 that represents variance between the predicted label $132P_U$ of the unlabeled training sample 112U and the predicted label $132P_A$ of the augmented training sample 112A. That is, a large inconsistency value 142 indicates that the unlabeled training sample 112U produces large unsupervised loss when the target model 130 converges. Conversely, a small inconsistency value 142 indicates that the unlabeled training sample 112U produces a small unsupervised loss when the target model 130 converges. In some examples, the greater the difference between the predicted labels $132P_U$, $132P_A$, the greater the associated inconsistency value 142.

A sample selector 150 receives the inconsistency value 142 associated with each of the unlabeled training samples 112U. The sample selector sorts the unlabeled training samples 112U in descending order based on the inconsistency values 142 and selects a current set of unlabeled training samples 112U r from the sorted unlabeled training samples 112U. That is, the sample selector 150 selects a threshold number of unlabeled training samples $112U_T$ based on their respective inconsistency values 142 to form a current set of unlabeled training samples $112U_T$. The sample selector 150 obtains, for each unlabeled training sample $112U_T$, a ground truth label 132G. The ground truth labels 132G are labels that are empirically determined by another source. In some implementations, an oracle 160 determines the ground truth labels 132G of the unlabeled training samples $112U_T$. Optionally, the oracle 160 is a human annotator or other human agent.

The sample selector 150 may send the selected unlabeled training samples $112U_T$ to the oracle 160. The oracle 160, in response to receiving the unlabeled training samples $112U_T$, determines or otherwise obtains the associated ground truth label 132G for each unlabeled training sample 112U r. The unlabeled training samples $112U_T$, combined with the ground truth labels 132G, form labeled training samples 112L and may be stored with other labeled training samples 112L (e.g., the labeled training samples 112L that the model trainer 110 used to initially train the target model 130). That is, the model trainer 110 may select a current set of labeled training samples 112L that includes the selected unlabeled training samples $110U_T$ paired with the corresponding ground truth labels 132G.

The model trainer 110 trains (e.g., retrains or fine-tunes), using the current set of labeled training samples 112L (i.e., the selected unlabeled training samples $112U_T$ and the corresponding ground truth labels 132G), the target model 130. In some implementations, the model trainer 110 trains, using the current set of labeled training samples 112L and a proper subset of unlabeled training samples $112U_P$ from the set of unlabeled training samples 112U, the target model 130. The proper subset of unlabeled training samples $112U_P$ may include each unlabeled training sample 112U that was not part of any set of unlabeled training samples $112U_T$ (i.e., unlabeled training samples 112U selected to obtain the corresponding ground truth label 132G). Put another way, the model trainer 110 may obtain the proper subset of unlabeled training samples $112U_P$ from the set of unlabeled training samples 112U by removing the threshold number of unlabeled training samples $112U_T$ from the set of unlabeled training samples 112U.

The model trainer 110 may also include in the training any previously labeled training samples 112L (i.e., from initial labels or from previous active learning cycles). Thus, the model trainer 110 may train the target model 130 on all labeled training samples 112L (i.e., the current set of labeled training samples 110L in addition to any previously labeled training samples 112L) and all remaining unlabeled training samples 112U (i.e., the set of unlabeled training samples 112U minus the selected unlabeled training samples $112U_T$) via semi-supervised learning. That is, in some examples, the active learning model trainer 110 completely retrains the target model 130 using all of the unlabeled training samples 112U and labeled training samples 112L. In other examples, the active learning model trainer incrementally retrains the target model 130 using only the newly obtained labeled training samples 112L. As used herein, training the target model 130 may refer to completely retraining the target model 130 from scratch or some form of retraining/fine-tuning the target model 130 by conducting additional training (with or without parameter changes such as by freezing weights of one or more layers, adjusting learning speed, etc.).

The model trainer 110 may repeat the process (i.e., perturbing unlabeled training samples 112U, determining inconsistency values 142, selecting unlabeled training samples $112U_T$, obtaining ground truth labels 132G, etc.) for any number of active learning cycles. For example, the active learning model trainer 110 repeats training of the target model 130 (and subsequently growing the set of labeled training samples 112L) for a predetermined number of cycles or until the target model 130 reaches a threshold effectiveness or until a labeling budget is satisfied. In this way, the model trainer 110 gradually increases the number of labeled training samples 112L until the number of samples is sufficient to train the target model 130.

Figure 2:
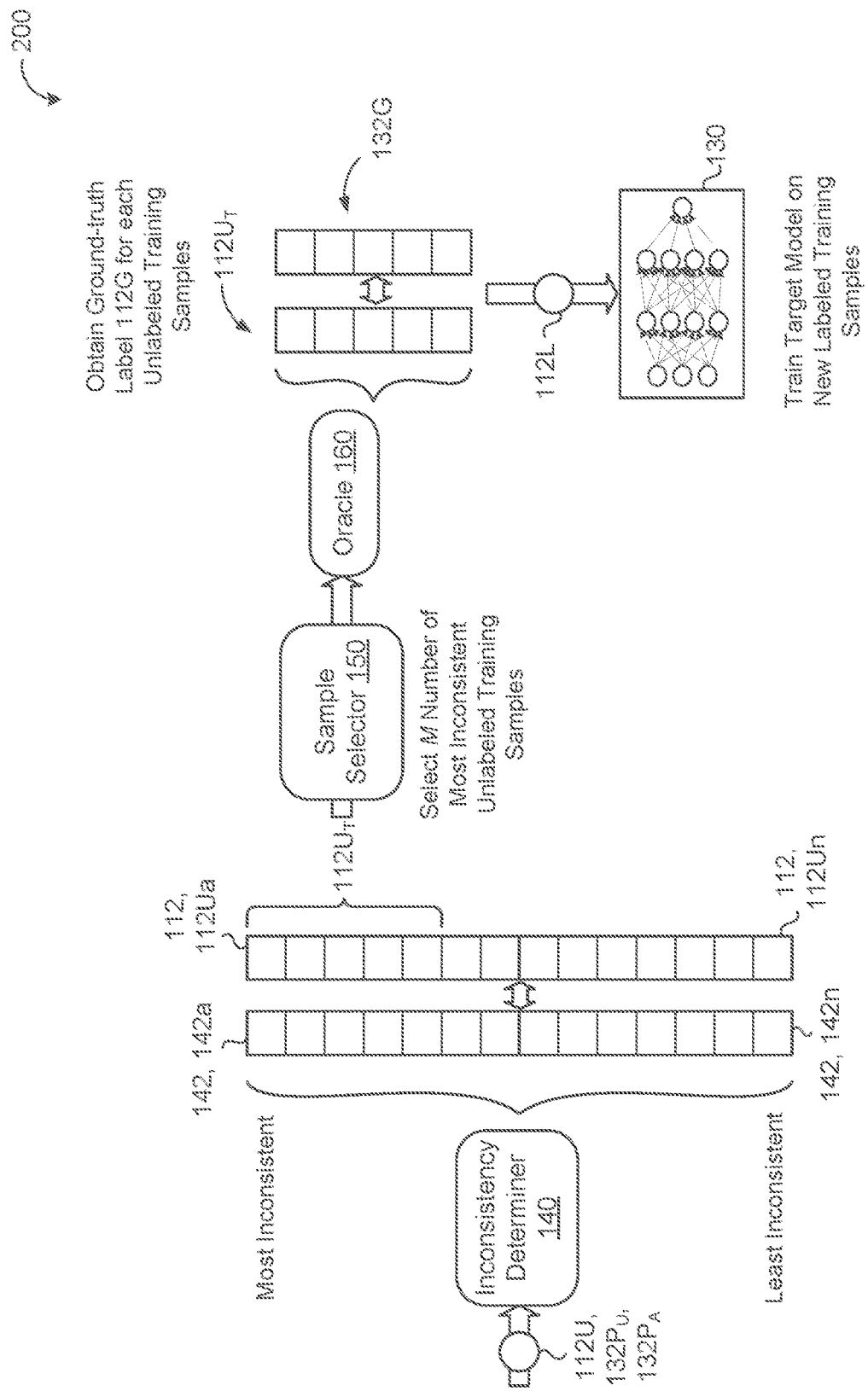
FIG. 2 is a schematic view of example components of the system of FIG. 1.

Referring now to FIG. 2, in some examples, the inconsistency value 142 for each unlabeled training sample 112U in the threshold number of unlabeled training samples $110U_T$ is greater than the inconsistency value 142 for each unlabeled training sample 112U not selected from the sorted unlabeled training samples 112U in the set of unlabeled training samples 112U. In this example, a schematic view 200 shows that the inconsistency determiner 140 sorts the inconsistency values 142, 142a-n from the most inconsistent value 142a (i.e., the highest inconsistent value 142) to the least inconsistent value 142n (i.e., the lowest inconsistent value). Each inconsistency value 142 has a corresponding unlabeled training sample 112U, 112Ua-n. Here, the most inconsistent value 142a corresponds to the unlabeled training sample 112Ua while the least inconsistent value 142n corresponds to the unlabeled training sample 112Un. In this example, the sample selector 150 selects the five unlabeled training samples 112U with the five most inconsistent values 142 as the current set of unlabeled training samples $112U_T$. It is understood that five is merely exemplary, and the sample selector 150 may select any number of unlabeled training samples 112U. Thus, the threshold number of unlabeled training samples $112U_T$ may be less than a cardinality of the set of unlabeled training samples 112U. In some implementations, the sample selector 150 selects a first M number (e.g., five, ten, fifty, etc.) of unlabeled training samples 112U from the sorted unlabeled training samples 112U in the set of unlabeled training samples 112U as the threshold number of training samples $112U_T$.

The selected unlabeled training samples 112U are passed to the oracle 160 to retrieve the corresponding ground truth labels 132G. Continuing with the illustrated example, the oracle 160 determines a corresponding ground truth label 132G for each of the five unlabeled training samples $112U_T$. The model trainer 110 may now use these five labeled training samples 112L (i.e., the five corresponding pairs of unlabeled training samples 112U and ground truth labels 132G) to train or retrain or fine-tune the target model 130.

Figure 3A:
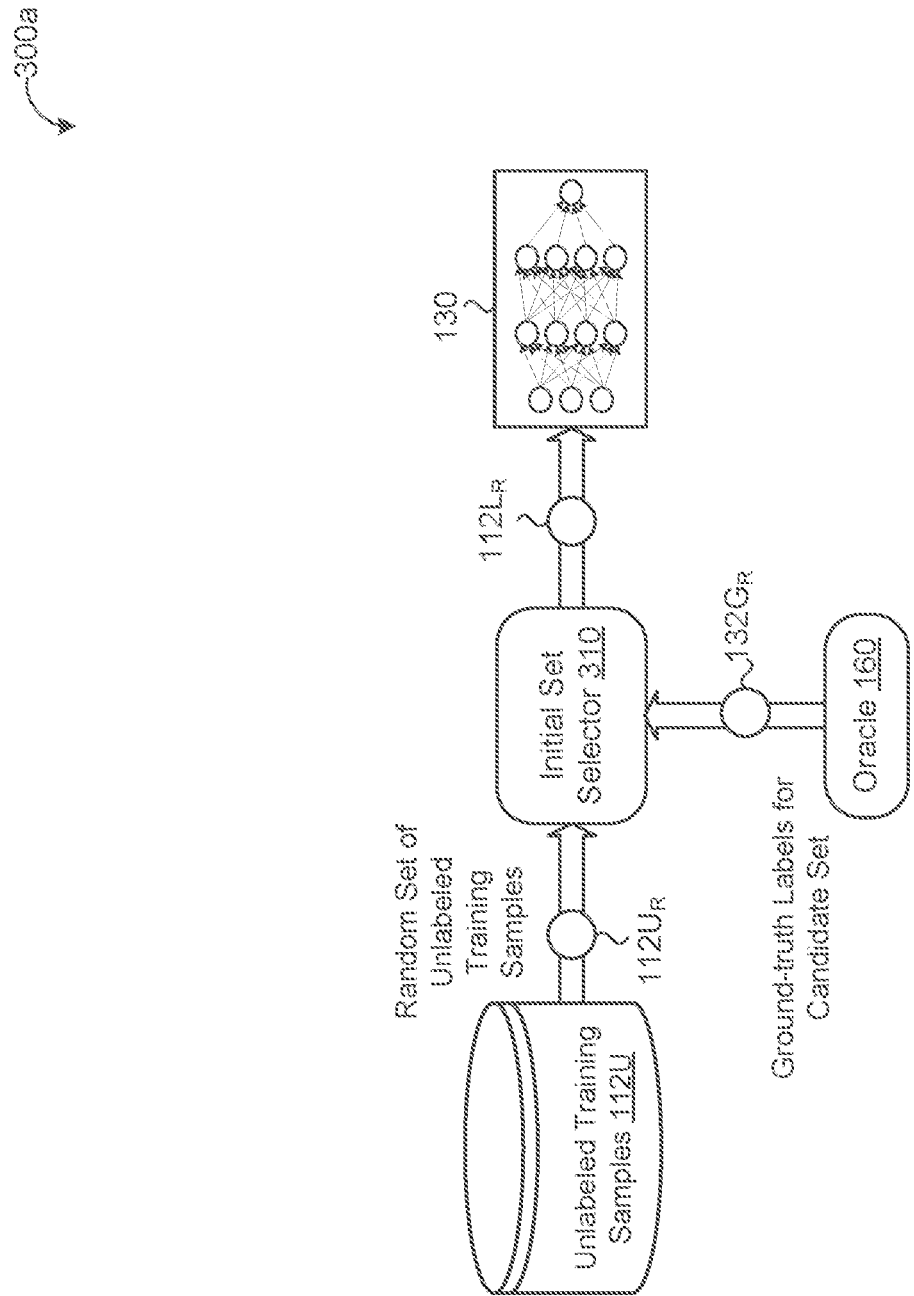
FIGS. 3A-3C are schematic views of components for determining an initial starting size of labeled training samples.
Figure 3B:
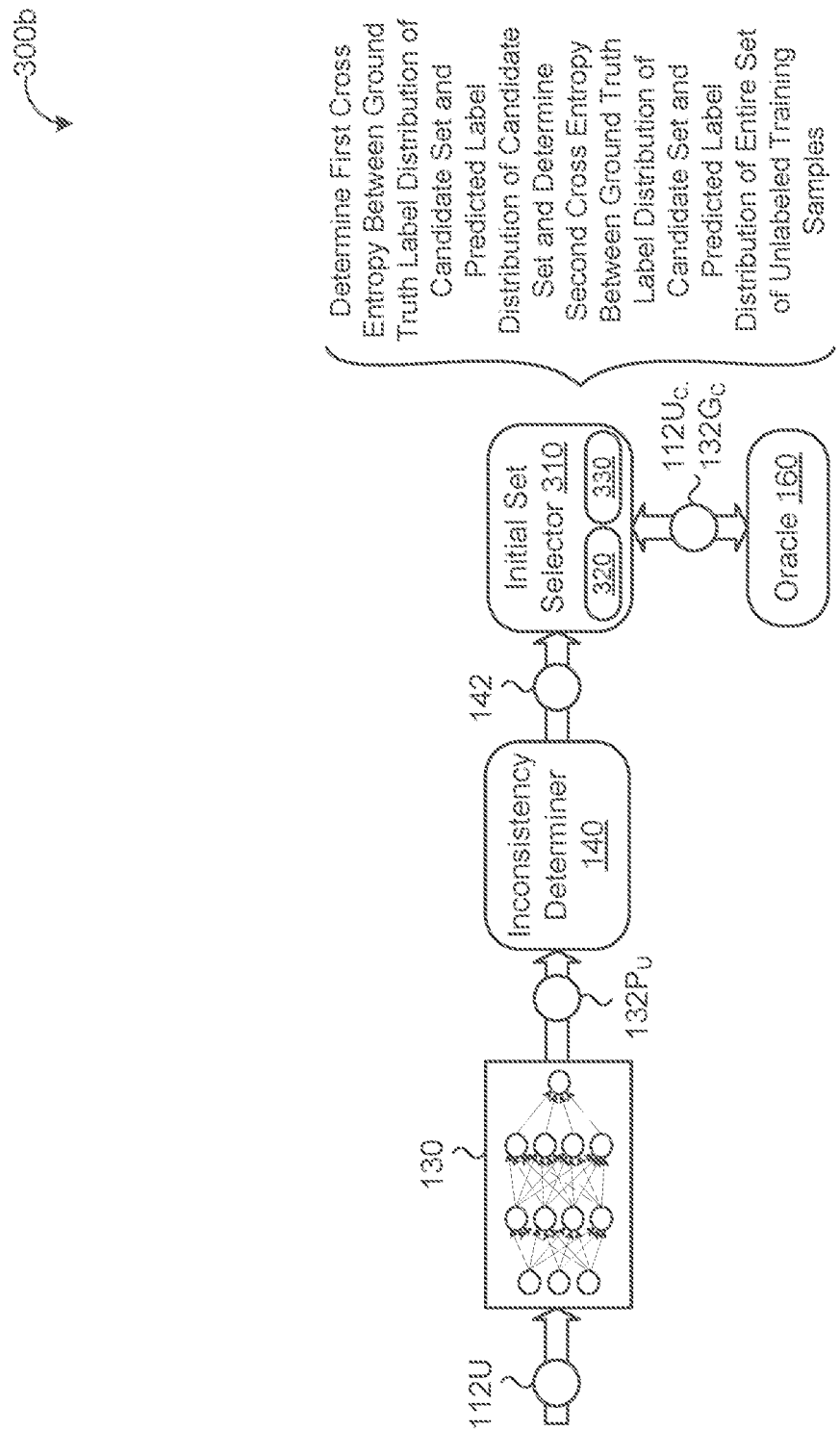
Figure 3C:
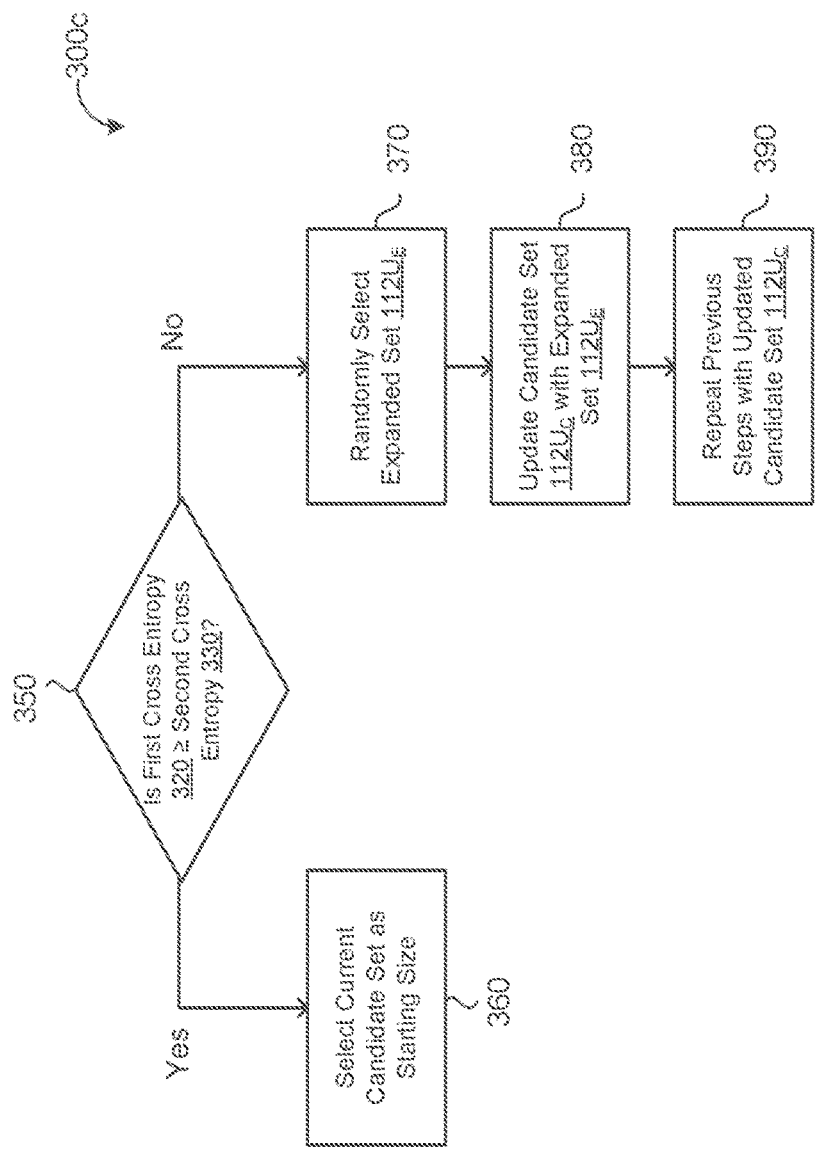

Referring now to FIGS. 3A-C, in some examples, the model trainer 110 provides initial training of the untrained target model 130 during an initial active learning cycle (i.e., the first active learning cycle). As shown in schematic view 300a (FIG. 3A), in some implementations, an initial set selector 310 randomly selects a random set of unlabeled training samples $112U_R$ from the set of unlabeled training samples 112U. The initial set selector 310 also obtains corresponding ground-truth labels $132G_R$ for each unlabeled training sample $112U_R$ in the random set of unlabeled training samples $112U_R$. The model trainer 110 may train, using the random set of unlabeled training samples $112U_R$ and the corresponding ground-truth labels $132G_R$ (to form a set of labeled training samples $112L_R$), the machine learning model 130. That is, in some implementations, prior to the target model 130 receiving any training, the model trainer 110 randomly selects a small set (relative to the entire set of unlabeled training samples $112U_R$ and obtains the corresponding ground-truth labels $132G_R$ to provide initial training of the target model 130.

Because the random set of unlabeled training samples $112U_R$ is both random and small, the training of the target model 130 is likely insufficient. To further refine a starting set of labeled training samples 112L to initially train the target model, the model trainer 110 may identify a candidate set of unlabeled training samples $112U_C$ from the set of unlabeled training samples 112U (e.g., fifty samples, one hundred samples, etc.). A cardinality of the candidate set of training samples $112U_C$ may be less than a cardinality of the set of unlabeled training samples 112U. For example, as shown in a schematic view 300b of FIG. 3B, the initial set selector 310 may receive inconsistency values 142 from the inconsistency determiner 140 based on predicted labels $132P_U$ from the target model 130 and select the candidate set of unlabeled training samples $112U_C$ based on the inconsistency values 142 of each unlabeled training sample 112U. That is, the model trainer 110 identifies the candidate set of unlabeled training samples $112U_C$ by determining the inconsistency value 142 for each unlabeled training sample $112U_C$ of the set of unlabeled training samples 112U. Optionally, the candidate set of unlabeled training samples $112U_C$ includes half of the unlabeled training samples 112U in the set of unlabeled training samples 112U with the highest corresponding inconsistency values 142.

After receiving corresponding ground truth labels $132G_C$, the initial set selector 310 may determine a first cross entropy 320 between a distribution of ground-truth labels 132G and a distribution of predicted labels $132P_U$ generated using the machine learning model 130 for the training samples in the candidate set of unlabeled training samples $112U_C$. The initial set selector 310 may also determine a second cross entropy 330 between the distribution of ground-truth labels 132G and a distribution of predicted labels $132P_U$ generated by the machine learning model 130 for the training samples in the set of unlabeled training samples 112U. That is, the first cross entropy 320 is between the actual label distribution for the candidate set $112U_C$ and the predicted label distribution for the candidate set $112U_C$ while the second cross entropy 330 is between the same actual label distribution for the candidate set $112U_C$ as the first cross entropy 320 and the predicted label distribution for the entire set of unlabeled training samples 112U. Cross entropy may be thought of generally as calculating the differences between two distributions.

Referring now to FIG. 3C and decision tree 300c, in some implementations, the initial set selector 310 determines whether the first cross entropy 320 is greater than or equal to the second cross entropy 330 at step 350. In this scenario, the differences between the actual label distributions and the predicted label distribution for the candidate set 112UC is greater than or equal to the differences between the actual label distributions and the predicted label distributions for the entire set of unlabeled training samples 112U. When the candidate set $112U_C$ is selected at least in part based on the largest inconsistency values 142 (i.e., the model trainer 110 determines the inconsistency value 142 for each unlabeled training sample 1121 of the set of unlabeled training samples 112U the model trainer 110 is selecting unlabeled training samples 112U that the model 130 is most uncertain about (i.e., samples 112U that tend to be far away from the data distribution) and thus indicates better performance.

Because of this indication, when the first cross entropy 320 is greater than or equal to the second cross entropy 330, at step 360, the initial set selector 310 may select the candidate set of unlabeled training samples $112U_C$ as a starting size of the current set of labeled training samples 112L. With the target model 130 initially trained, the model trainer 110 may proceed with subsequent active learning cycles as described above (FIGS. 1 and 2).

When the first cross entropy 320 is less than the second cross entropy 330 (i.e., an indication of poor target model 130 performance), the current candidate set $112U_C$ is inadequate for initial training of the target model 130. In this example, the initial set selector 310, at step 370, randomly selects an expanded set of training samples $112U_E$ from the unlabeled set of training samples 112U. At step 380, the initial set selector 310 updates the candidate set of unlabeled training samples $112U_C$ to include the expanded set of training samples $112U_E$ randomly selected from the unlabeled set of training samples 112U. In some examples, the initial set selector 310 updates the unlabeled set of training samples 112U by removing each training sample from the expanded set of training samples $112U_s$ from the unlabeled set of training samples 112U. This ensures that unlabeled training samples 112U are not duplicated.

During an immediately subsequent active learning cycle (i.e., the next active learning cycle), at step 390, the initial set selector 310 may repeat each of the previous steps with the updated candidate set $112U_C$. For example, the initial set selector 310 determines the first cross entropy 320 between the distribution of ground truth labels 132G and the distribution of predicted labels 132P generated using the machine learning model 130 for the training samples in the updated candidate set of unlabeled training samples $112U_C$. The initial set selector 310 also determines the second cross entropy 330 between the distribution of ground truth labels 132G and the distribution of predicted labels 132P generated using the machine learning model 130 for the training samples in the updated candidate set of unlabeled training samples $112U_C$. The initial set selector 310 again determines whether the first cross entropy 320 is greater than or equal to the second cross entropy 330. When the first cross entropy 320 is greater than or equal to the second cross entropy 330, the initial set selector selects the updated candidate set of unlabeled training samples $112U_C$ as a starting size for initially training the machine learning model 130. When the first cross entropy 320 is less than the second cross entropy 330, the initial set selector 310 may continue to iteratively expand the candidate set $112U_C$ until the first cross entropy 320 is greater than or equal to the second cross entropy 330 (i.e., indicates that the target model 130 performance is sufficient).

Figure 4:
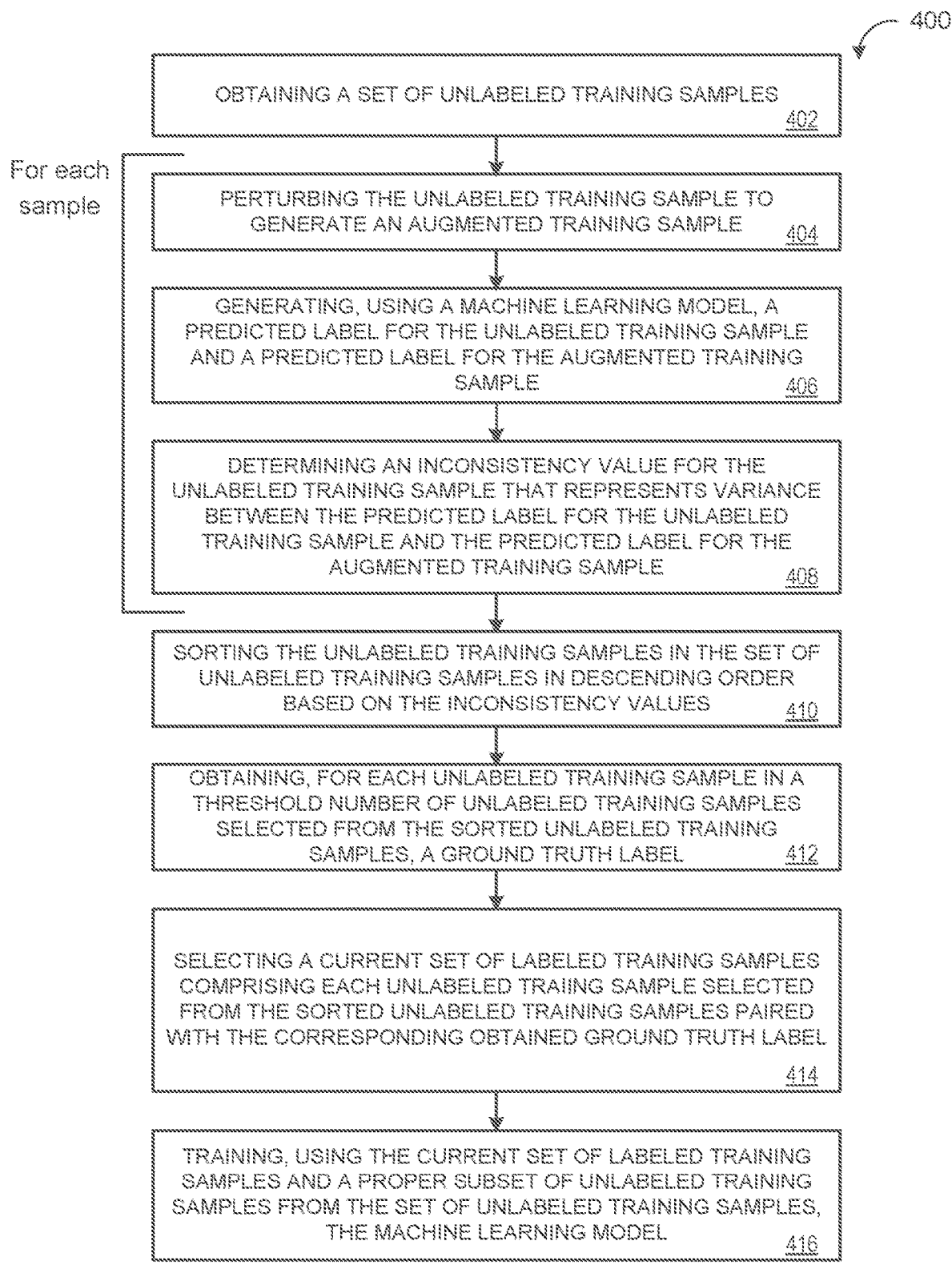
FIG. 4 is a flowchart of an example arrangement of operations for a method of active learning via a sample consistency assessment.

FIG. 4 is a flowchart of an exemplary arrangement of operations for a method 400 for active learning via a sample consistency assessment. The method 400, at step 402, includes obtaining, by data processing hardware 12, a set of unlabeled training samples 112U. During each of a plurality of active learning cycles, for each unlabeled training sample 112U in the set of unlabeled training samples 112U, the method 400, at step 404, includes perturbing, by the data processing hardware 12, the unlabeled training sample 112U to generate an augmented training sample 112A. At step 406, the method 400 includes generating, by the data processing hardware 12, using a machine learning model 130 configured to receive the unlabeled training sample 112U and the augmented training sample 112A as inputs, a predicted label $132P_U$ for the unlabeled training sample 112U and a predicted label $132P_A$ for the augmented training sample 112A.

At step 408, the method 400 includes determining, by the data processing hardware 12, an inconsistency value 142 for the unlabeled training sample 112U. The inconsistency value 142 represents variance between the predicted label $132P_U$ for the unlabeled training sample 112U and the predicted label $132P_A$ for the augmented training sample 112A. The method 400, at step 410, includes sorting, by the data processing hardware 12, the unlabeled training samples 112U in the set of unlabeled training samples 112U in descending order based on the inconsistency values 142.

At step 412, the method 400 includes obtaining, by the data processing hardware 12, for each unlabeled training sample 112U in a threshold number of unlabeled training samples $112U_T$ selected from the sorted unlabeled training samples 112U in the set of unlabeled training samples 112U, a ground truth label 132G. The method 400, at step 414, includes selecting, by the data processing hardware 12, a current set of labeled training samples 112L, the current set of labeled training samples 112L including each unlabeled training sample 112U in the threshold number of unlabeled training samples $112U_T$ selected from the sorted unlabeled training samples 112U in the set of unlabeled training samples 112U paired with the corresponding obtained ground truth label 132G. At step 416, the method 400 includes training, by the data processing hardware 12, using the current set of labeled training samples 112L and a proper subset of unlabeled training samples $112U_P$ from the set of unlabeled training samples 112U, the machine learning model 130.

Thus, the model trainer 110 may identify unlabeled training samples 112U that have a high potential for performance improvement relative to the performance improvement of other unlabeled training samples 112U without increasing (and potentially reducing) the total labeling cost (e.g., expenditure of computation resources, consumption of human annotator time, etc.). The model trainer 110 also determines an appropriate size for an initial or starting set of labeled training examples 112L by using a cost-efficient approach that avoids overhead stemming from starting with large sets of labeled data samples 112L while also ensuring optimal model performance with a limited number of labeled training samples 112L (i.e., compared to conventional techniques).

Figure 5:
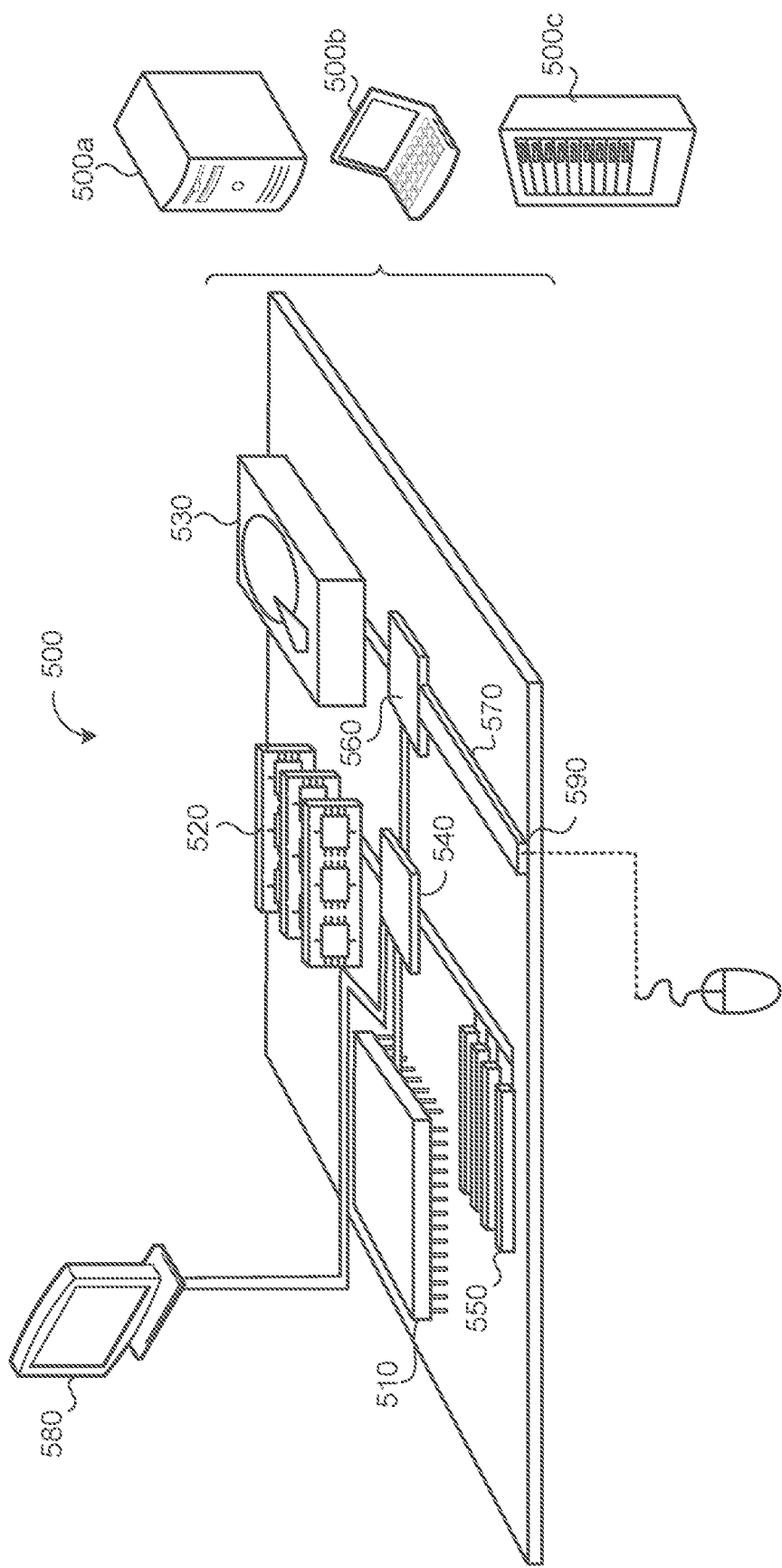
FIG. 5 is a schematic view of an example computing device that may be used to implement the systems and methods described herein.

FIG. 5 is schematic view of an example computing device 500 that may be used to implement the systems and methods described in this document. The computing device 500 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

The computing device 500 includes a processor 510, memory 520, a storage device 530, a high-speed interface/controller 540 connecting to the memory 520 and high-speed expansion ports 550, and a low speed interface/controller 560 connecting to a low speed bus 570 and a storage device 530. Each of the components 510, 520, 530, 540, 550, and 560, are interconnected using various busses, and may be mounted on a common motherboard or in other manners as appropriate. The processor 510 can process instructions for execution within the computing device 500, including instructions stored in the memory 520 or on the storage device 530 to display graphical information for a graphical user interface (GUI) on an external input/output device, such as display 580 coupled to high speed interface 540. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 520 stores information non-transitorily within the computing device 500. The memory 520 may be a computer-readable medium, a volatile memory unit(s), or non-volatile memory unit(s). The non-transitory memory 520 may be physical devices used to store programs (e.g., sequences of instructions) or data (e.g., program state information) on a temporary or permanent basis for use by the computing device 500. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

The storage device 530 is capable of providing mass storage for the computing device 500. In some implementations, the storage device 530 is a computer-readable medium. In various different implementations, the storage device 530 may be a floppy disk device, a hard disk device, an optical disk device, or a tape device, a flash memory or other similar solid state memory device, or an array of devices, including devices in a storage area network or other configurations. In additional implementations, a computer program product is tangibly embodied in an information carrier. The computer program product contains instructions that, when executed, perform one or more methods, such as those described above. The information carrier is a computer- or machine-readable medium, such as the memory 520, the storage device 530, or memory on processor 510.

The high speed controller 540 manages bandwidth-intensive operations for the computing device 500, while the low speed controller 560 manages lower bandwidth-intensive operations. Such allocation of duties is exemplary only. In some implementations, the high-speed controller 540 is coupled to the memory 520, the display 580 (e.g., through a graphics processor or accelerator), and to the high-speed expansion ports 550, which may accept various expansion cards (not shown). In some implementations, the low-speed controller 560 is coupled to the storage device 530 and a low-speed expansion port 590. The low-speed expansion port 590, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 500a or multiple times in a group of such servers 500a, as a laptop computer 500b, or as part of a rack server system 500c.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices, magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback, and input from the user can be received in any form, including acoustic, speech, or tactile input. In addition, a computer can interact with a user by sending documents to and receiving documents from a device that is used by the user, for example, by sending web pages to a web browser on a user's client device in response to requests received from the web browser.

A number of implementations have been described. Nevertheless, it will be understood that various modifications may be made without departing from the spirit and scope of the disclosure. Accordingly, other implementations are within the scope of the following claims.

What is claimed is:

1. A method for training a machine learning model, the method comprising:
   obtaining, by data processing hardware, a set of unlabeled training samples; and
   during each of a plurality of active learning cycles of training the machine learning model:
      for each unlabeled training sample in the set of unlabeled training samples:
         perturbing, by the data processing hardware, the unlabeled training sample to generate an augmented training sample;
         generating, by the data processing hardware, using the machine learning model configured to receive the unlabeled training sample and the augmented training sample as inputs, a predicted label for the unlabeled training sample and a predicted label for the augmented training sample; and
         determining, by the data processing hardware, an inconsistency value for the unlabeled training sample, the inconsistency value representing variance between the predicted label for the unlabeled training sample and the predicted label for the augmented training sample;
      sorting, by the data processing hardware, the unlabeled training samples in the set of unlabeled training samples in a descending order based on the inconsistency values;
      obtaining, by the data processing hardware, for each unlabeled training sample in a threshold number of unlabeled training samples selected from the sorted unlabeled training samples in the set of unlabeled training samples, a ground truth label; and
      selecting, by the data processing hardware, a current set of labeled training samples, the current set of labeled training samples comprising each unlabeled training sample in the threshold number of unlabeled training samples selected from the sorted unlabeled training samples in the set of unlabeled training samples paired with the corresponding obtained ground truth label; and
      training, by the data processing hardware, using the current set of labeled training samples and a subset of unlabeled training samples from the set of unlabeled training samples, the machine learning model;
   during an initial active learning cycle:
      randomly selecting, by the data processing hardware, a random set of unlabeled training samples from the set of unlabeled training samples;
      obtaining, by the data processing hardware, corresponding ground truth labels for each unlabeled training sample in the random set of unlabeled training samples;
      training, by the data processing hardware, using the random set of unlabeled training samples and the corresponding ground truth labels, the machine learning model;
      identifying, by the data processing hardware, a candidate set of unlabeled training samples from the set of unlabeled training samples, wherein a cardinality of the candidate set of unlabeled training samples is less than a cardinality of the set of unlabeled training samples;
      determining, by the data processing hardware, a first cross entropy between a distribution of ground truth labels and a distribution of predicted labels generated using the machine learning model for the unlabeled training samples in the candidate set of unlabeled training samples;
      determining, by the data processing hardware, a second cross entropy between a distribution of ground truth labels and a distribution of predicted labels generated using the machine learning model for the unlabeled training samples in the set of unlabeled training samples;
      determining, by the data processing hardware, whether the first cross entropy is greater than or equal to the second cross entropy; and
      when the first cross entropy is greater than or equal to the second cross entropy, selecting, by the data processing hardware, the candidate set of unlabeled training samples as a starting size for initially training the machine learning model;
      when the first cross entropy is less than the second cross entropy:
         randomly selecting, by the data processing hardware, an expanded set of unlabeled training samples from the set of unlabeled training samples;
         updating, by the data processing hardware, the candidate set of unlabeled training samples to include the expanded set of unlabeled training samples randomly selected from the set of unlabeled training samples;
         updating, by the data processing hardware, the set of unlabeled training samples by removing each unlabeled training sample from the expanded set of unlabeled training samples from the set of unlabeled training samples; and
   during an immediately subsequent active learning cycle:
      determining, by the data processing hardware, the first cross entropy between a distribution of ground truth labels and a distribution of predicted labels generated using the machine learning model for the unlabeled training samples in the updated candidate set of unlabeled training samples;
      determining, by the data processing hardware, the second cross entropy between the distribution of ground truth labels and a distribution of predicted labels generating using the machine learning model for the unlabeled training samples in the updated candidate set of unlabeled training samples;
      determining, by the data processing hardware, whether the first cross entropy is greater than or equal to the second cross entropy; and
      when the first cross entropy is greater than or equal to the second cross entropy, selecting, by the data processing hardware, the updated candidate set of unlabeled training samples as a starting size for initially training the machine learning model.

2. The method of claim 1, wherein a number of unlabeled training samples in the first plurality of unlabeled training samples is less than a cardinality of the set of unlabeled training samples.

3. The method of claim 1, wherein the inconsistency value for each unlabeled training sample in the first plurality of unlabeled training samples is greater than the inconsistency value for each unlabeled training sample not selected from the sorted set of unlabeled training samples.

4. The method of claim 1, further comprising obtaining, by the data processing hardware, the subset of unlabeled training samples from the sorted set of unlabeled training samples by removing the first plurality of unlabeled training samples from the sorted set of unlabeled training samples.

5. The method of claim 1, further comprising selecting, by the data processing hardware, a first M number of unlabeled training samples from the sorted set of unlabeled training samples for the first plurality of unlabeled training samples.

6. The method of claim 1, wherein identifying the candidate set of unlabeled training samples from the set of unlabeled training samples comprises determining the inconsistency value for each unlabeled training sample of the set of unlabeled training samples.

7. The method of claim 1, wherein the machine learning model comprises a convolutional neural network.

8. A system comprising:
data processing hardware; and
memory hardware in communication with the data processing hardware, the memory hardware storing instructions that when executed on the data processing hardware cause the data processing hardware to perform operations comprising:
  obtaining a set of unlabeled training samples; and
  during each of a plurality of active learning cycles of training a machine learning model:
    for each unlabeled training sample in the set of unlabeled training samples:
      perturbing the unlabeled training sample to generate an augmented training sample;
      generating, using the machine learning model configured to receive the unlabeled training sample and the augmented training sample as inputs, a predicted label for the unlabeled training sample and a second predicted label for the augmented training sample; and
      determining an inconsistency value for the unlabeled training sample, the inconsistency value representing variance between the predicted label for the unlabeled training sample and the predicted label for the augmented training sample;
    sorting the unlabeled training samples in the set of unlabeled training samples in a descending order based on the respective inconsistency values;
    obtaining for each unlabeled training sample in a threshold number of unlabeled training samples selected from the sorted unlabeled training samples in the set of unlabeled training samples, a ground truth label; and
    selecting a current set of labeled training samples, the current set of labeled training samples comprising each unlabeled training sample in the threshold number of unlabeled training samples selected from the sorted unlabeled training samples in the set of unlabeled training samples paired with the corresponding obtained ground truth label; and
    training, using the current set of labeled training samples and a subset of unlabeled training samples from the set of unlabeled training samples, the machine learning model;
  during an initial active learning cycle:
    randomly selecting a random set of unlabeled training samples from the set of unlabeled training samples;
    obtaining corresponding ground truth labels for each unlabeled training sample in the random set of unlabeled training samples;
    training using the random set of unlabeled training samples and the corresponding ground truth labels, the machine learning model;
    identifying a candidate set of unlabeled training samples from the set of unlabeled training samples, wherein a cardinality of the candidate set of unlabeled training samples is less than a cardinality of the set of unlabeled training samples;
    determining a first cross entropy between a distribution of ground truth labels and a distribution of predicted labels generated using the machine learning model for the unlabeled training samples in the candidate set of unlabeled training samples;
    determining a second cross entropy between a distribution of ground truth labels and a distribution of predicted labels generated using the machine learning model for the unlabeled training samples in the set of unlabeled training samples;
    determining whether the first cross entropy is greater than or equal to the second cross entropy; and
    when the first cross entropy is greater than or equal to the second cross entropy, selecting the candidate set of unlabeled training samples as a starting size for initially training the machine learning model;
    when the first cross entropy is less than the second cross entropy:
      randomly selecting an expanded set of unlabeled training samples from the set of unlabeled training samples;
      updating the candidate set of unlabeled training samples to include the expanded set of unlabeled training samples randomly selected from the set of unlabeled training samples;
      updating the set of unlabeled training samples by removing each unlabeled training sample from the expanded set of unlabeled training samples from the set of unlabeled training samples; and
  during an immediately subsequent active learning cycle:
    determining the first cross entropy between a distribution of ground truth labels and a distribution of predicted labels generated using the machine learning model for the unlabeled training samples in the updated candidate set of unlabeled training samples;
    determining the second cross entropy between the distribution of ground truth labels and a distribution of predicted labels generating using the machine learning model for the unlabeled training samples in the updated candidate set of unlabeled training samples;
    determining whether the first cross entropy is greater than or equal to the second cross entropy; and
    when the first cross entropy is greater than or equal to the second cross entropy, selecting the updated candidate set of unlabeled training samples as a starting size for initially training the machine learning model.

9. The system of claim 8, wherein a number of unlabeled training samples in the first plurality of unlabeled training samples is less than a cardinality of the set of unlabeled training samples.

10. The system of claim 8, wherein the inconsistency value for each unlabeled training sample in the first plurality of unlabeled training samples is greater than the inconsistency value for each unlabeled training sample not selected from the sorted set of unlabeled training samples.

11. The system of claim 8, wherein the operations further comprise obtaining the subset of unlabeled training samples from the sorted set of unlabeled training samples by removing the first plurality of unlabeled training samples from the sorted set of unlabeled training samples.

12. The system of claim 8, wherein the operations further comprise selecting a first M number of unlabeled training samples from the sorted set of unlabeled training samples for the first plurality of unlabeled training samples.

13. The system of claim 8, wherein identifying the candidate set of unlabeled training samples from the set of unlabeled training samples comprises determining the inconsistency value for each unlabeled training sample of the set of unlabeled training samples.

14. The system of claim 8, wherein the machine learning model comprises a convolutional neural network.

15. The method of claim 1, wherein:
  the set of unlabeled training samples is a set of unlabeled digital images;
  perturbing, by the data processing hardware, the respective unlabeled training sample to change the respective unlabeled training sample into a corresponding augmented training sample, comprises:
    applying one or more transformations to each respective unlabeled digital image including rotating, flipping, or cropping to create a corresponding augmented digital image.

* * * * *